Figure 1:
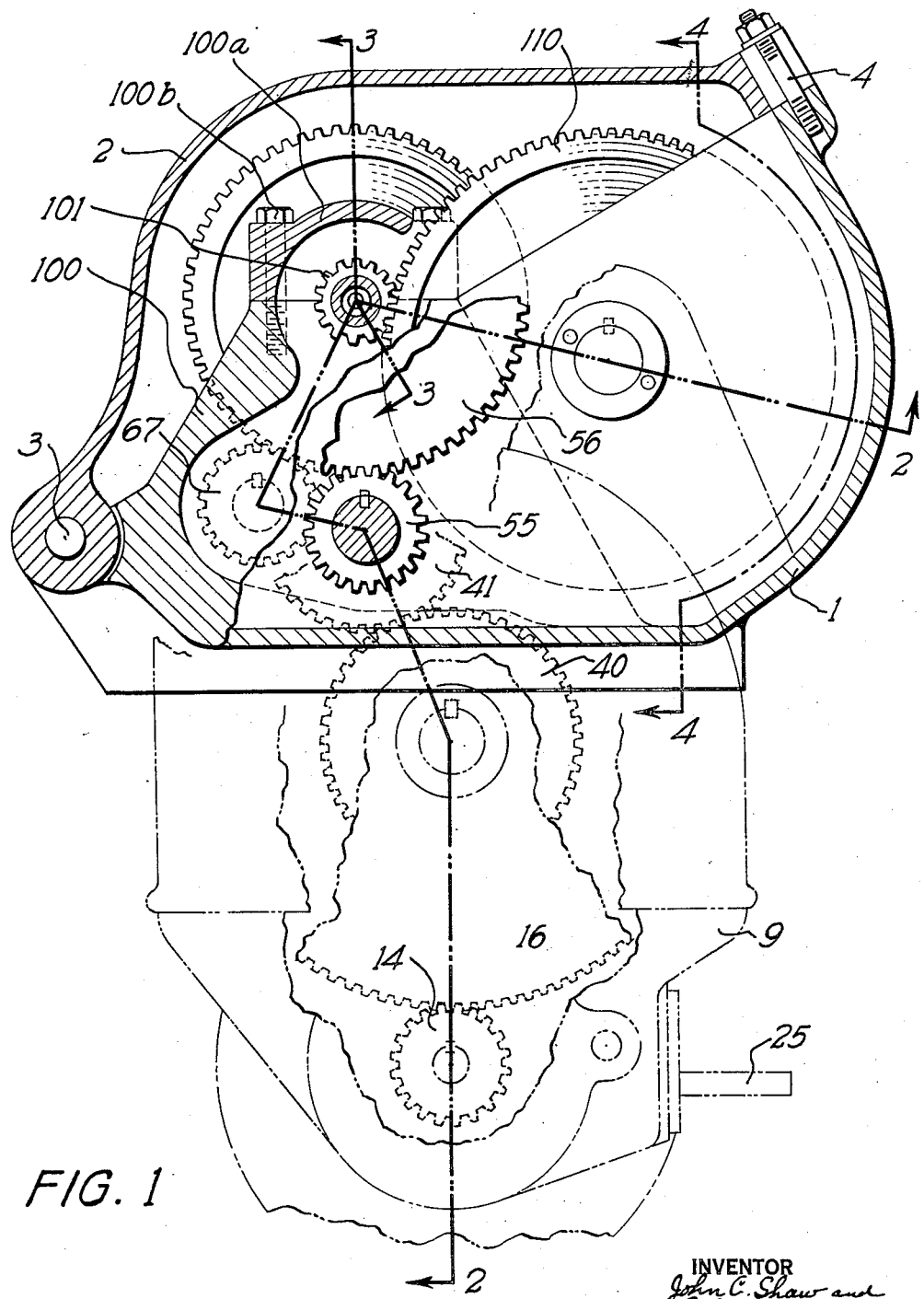

Jan. 13, 1931.  J. C. SHAW ET AL  1,789,116
MAGNETIC CLUTCH GEAR CASE UNIT
Filed Nov. 19, 1927  5 Sheets-Sheet 1

INVENTOR
John C. Shaw and
BY Robert D. Shaw
M. H. Lockwood
ATTORNEY

Jan. 13, 1931.  J. C. SHAW ET AL  1,789,116
MAGNETIC CLUTCH GEAR CASE UNIT
Filed Nov. 19, 1927   5 Sheets-Sheet 4

INVENTOR
John C. Shaw and
BY Robert D. Shaw
N. H. Lockwood
ATTORNEY

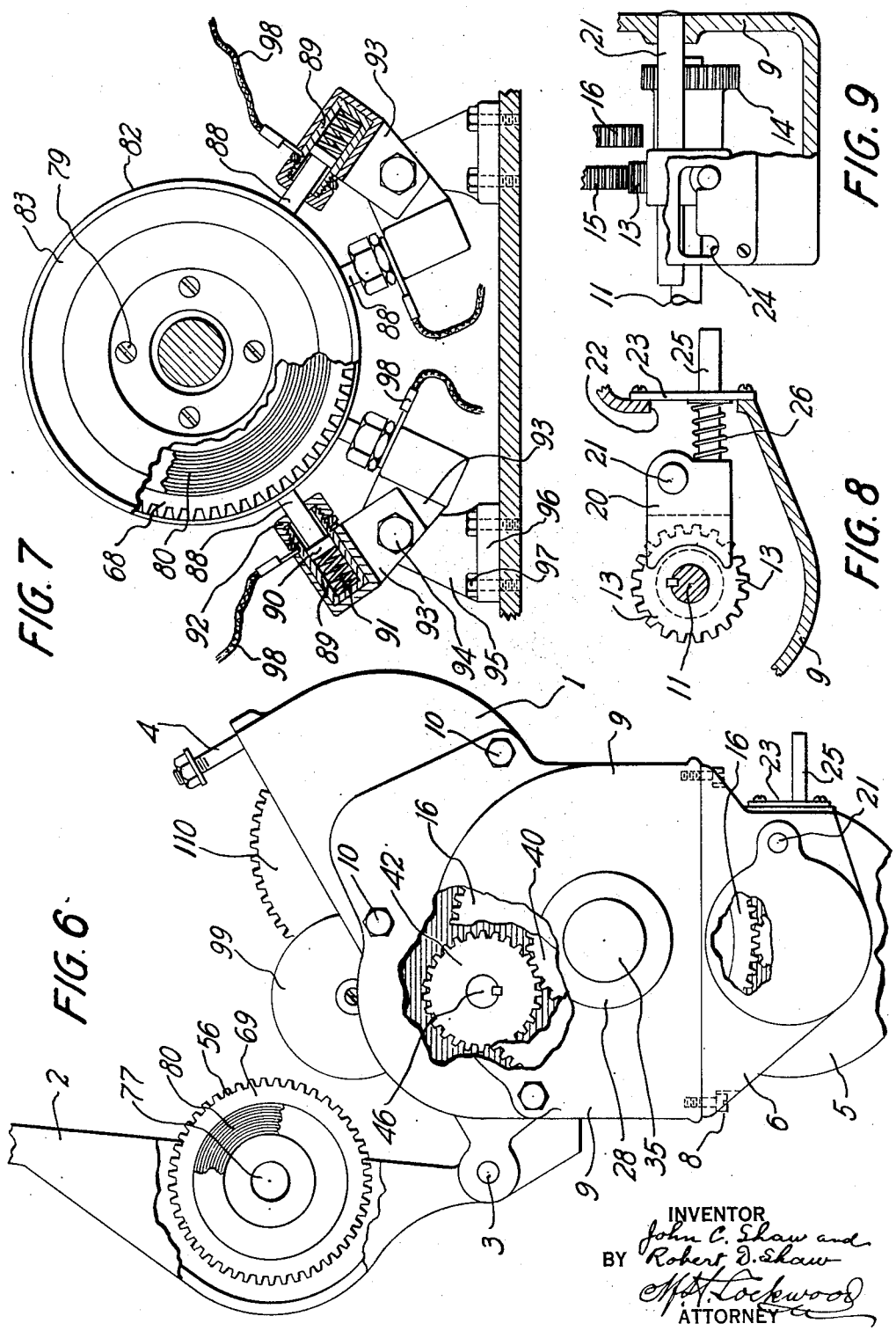

Patented Jan. 13, 1931

1,789,116

UNITED STATES PATENT OFFICE

JOHN C. SHAW AND ROBERT D. SHAW, OF BROOKLYN, NEW YORK, ASSIGNORS TO KELLER MECHANICAL ENGINEERING CORPORATION, OF BROOKLYN, NEW YORK, A CORPORATION OF NEW YORK

MAGNETIC-CLUTCH GEAR-CASE UNIT

Application filed November 19, 1927. Serial No. 234,408.

This invention relates more particularly to an improved magnetic clutch feed drive, which may be manufactured and assembled as a separate unit and may be attached to machine tools of various kinds for operating the feed, either for direct or reverse motion, under motor driven magnetic clutch control and which is so constructed and arranged that parts may be separated for access to the magnetic clutches for cleaning or adjustment.

In our experience with magnetic clutches wherein rotary magnets cooperate with rotary armature discs for transmitting power to the feed devices, it has been found that the cooperating surfaces between the magnets and the armatures become dirty or fouled with particles of material attracted to the rotary members during magnetization and demagnetization thereof, so that for accurate control and rapid release of the clutch, it is necessary to occasionally wipe off or clean the cooperating surfaces of the magnets and armatures. Therefore, an important object of our improvement is to so mount the clutch magnets and armatures in the casing unit, that they may be readily separated bodily for the purpose of cleaning the surfaces of the magnets and armatures.

The arrangement just mentioned, for bodily separating the magnets and armatures, is preferably accomplished in our improvement by providing a two-part casing, in which a lid or cover portion is hinged to the body portion of the casing and the clutch magnets are rotatably supported on the cover member, so that when the latter is lifted or thrown back, the magnets are separated from the armatures, thereby rendering the magnet faces, as well as the armatures accessible for cleaning. With this construction, a further object is accomplished in our improvement by mounting the contact brushes, which cooperate with collector rings on the respective clutch magnets for energizing the latter, in the lower or body portion of the casing, so that when the clutch magnets are separated from the armatures, the brushes are made accessible for cleaning, adjustment or replacement.

A further object is to provide suitable gearing connections between the motor and the magnetic clutch members, such as will permit the bodily separation of the clutch magnets from their associated armatures, and this is preferably accomplished, in the present instance, by spur gears and pinions, the latter being interconnected so that the clutch magnets are rotated in opposite directions, the drive from the motor being geared to one of the pinion shafts.

Figure 2:
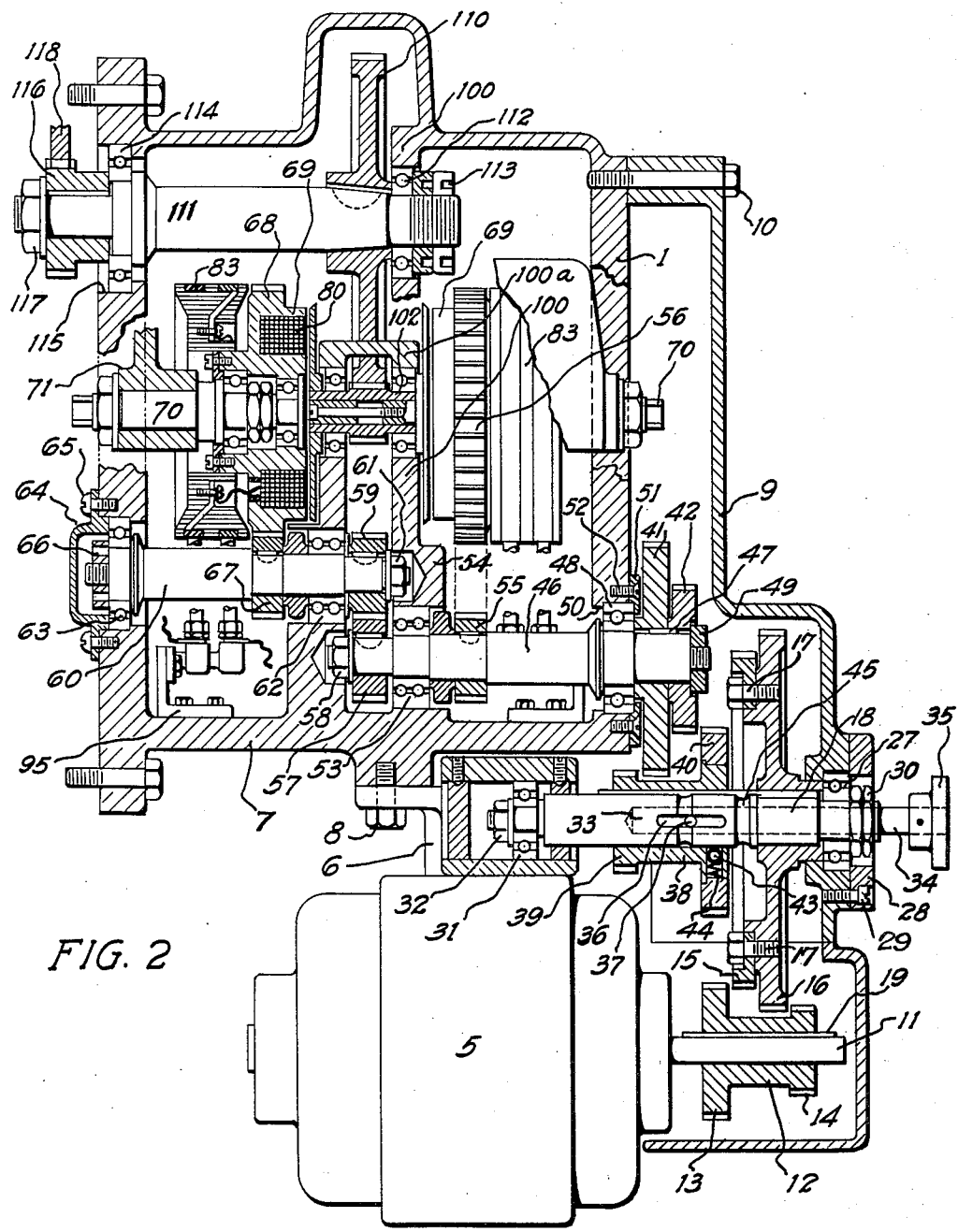
Figure 3:
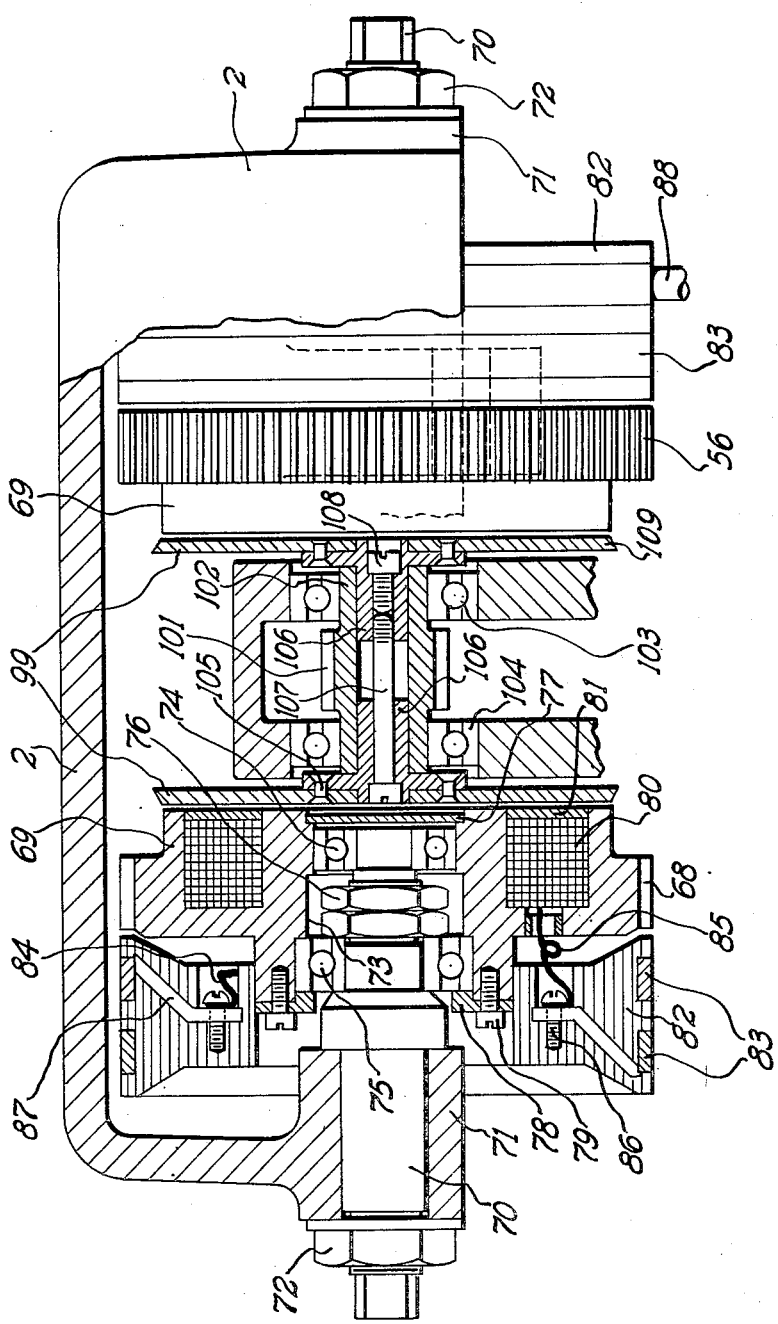
Figure 4:
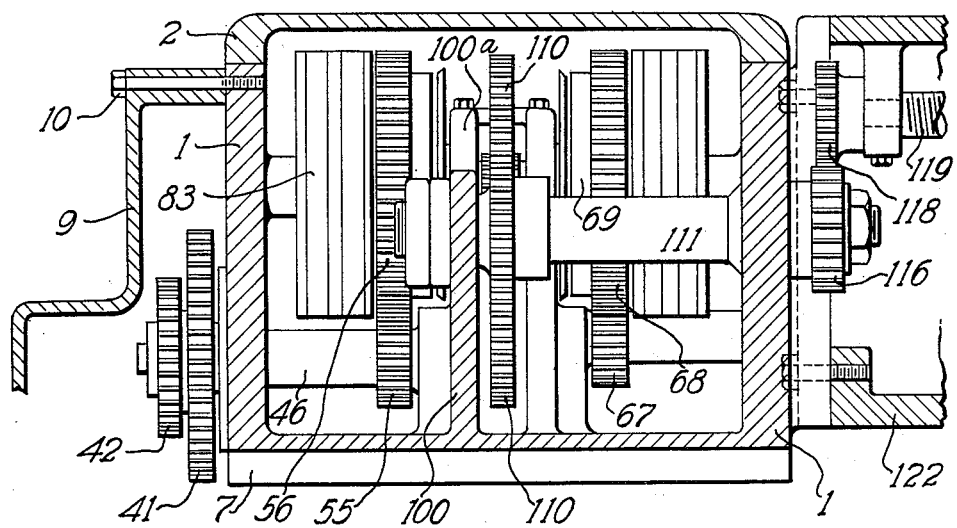
Figure 5:
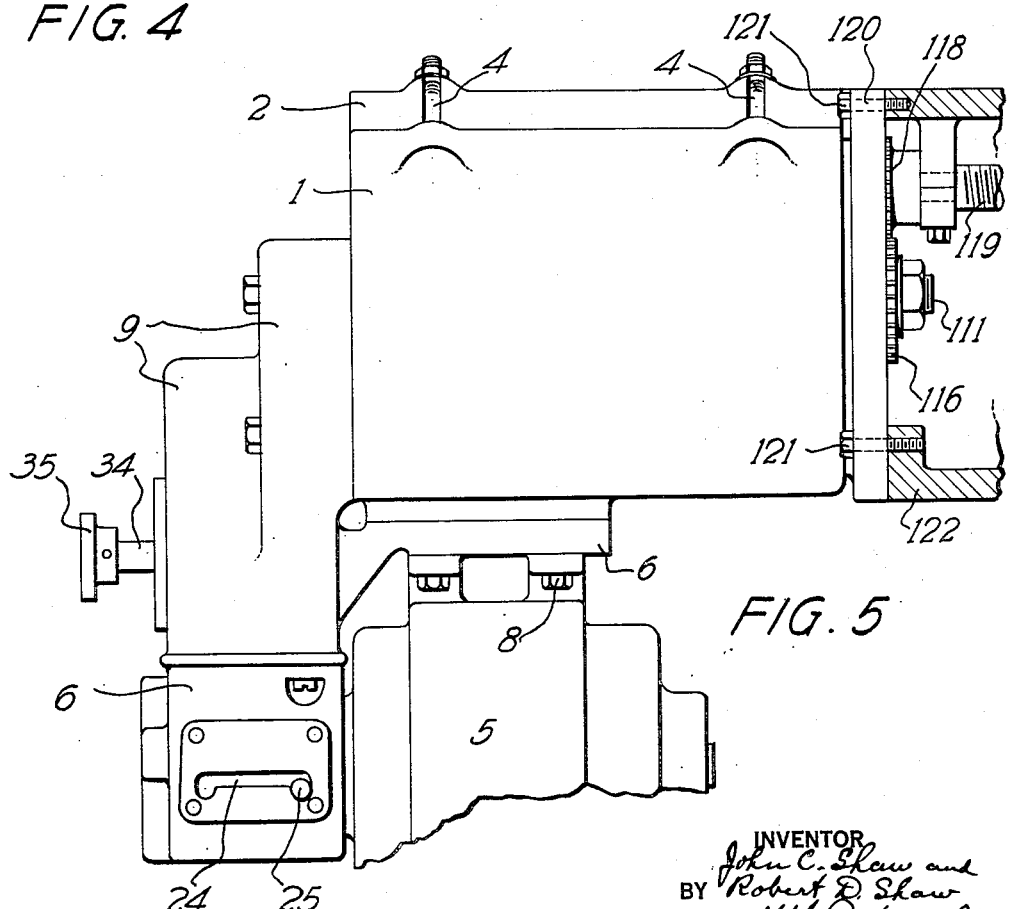

One form and arrangement of our improved magnetic clutch gear case unit is shown in the accompanying drawings, in which Fig. 1 is a vertical side elevation, partially in section; Fig. 2 is a transverse section on the irregular line 2—2 of Fig. 1, to illustrate the gearing connection from the motor to the feed drive; Fig. 3 is an enlarged view of the magnetic clutches, partially in section on the line 3—3 of Fig. 1; Fig. 4 is an elevation view of the magnetic clutch drive to the feed screw, with the gear casing cut away on the line 4—4 of Fig. 1; Fig. 5 is a side elevation of the gear casing, as attached to a machine tool; Fig. 6 is a side elevation, similar to Fig. 1, with parts of the casing broken away and the cover section raised, so as to separate the clutch magnets from the armatures; Fig. 7 is a detail sectional view, showing the contact brushes cooperating with the contact rings on the clutch magnets; and Figs. 8 and 9 are sectional details of the gear shift associated with the motor drive.

Referring to the drawings, it will be seen that our improved magnetic clutch and gear drive are mounted in a two-part casing, the lower or body portion 1 of which is provided with a plurality of integral partitions, adapted to form bearing supports for various parts of the mechanism as hereinafter described. The casing is provided with a removable upper or cover section 2, which is preferably hinged to the lower or body section 1 by the hinge 3, and may be secured in closed position by means of a bolt and nut at 4, as will be seen in Fig. 1.

The electric motor 5 for driving the magnetic clutches, which are adapted to control the feed, is mounted on a casing bracket 6, secured to the bottom 7 of the casing member 1, by suitable bolts 8. The power of the motor is adapted to be transmitted to the magnetic clutches through a series of intermediate gears, including gear shifts for changing the speed of the magnetic clutches. A supplemental or auxiliary casing member 9, for enclosing the gearing and providing suitable bearings for portions thereof, is attached to the side of the casing member 1 by suitable bolts 10, as indicated in Figs. 2 and 6.

The shaft 11 of the motor 5 is preferably provided with a shiftable collar 12, having two spur pinions 13 and 14, of different diameters projecting from the ends thereof and adapted to cooperate respectively, with spur gears 15 and 16, which are here shown as secured together by bolts 17 and mounted upon a shaft 18, as will be seen in Fig. 2. The collar 12, carrying the pinions 13 and 14, is slidably mounted on the motor shaft 11, to which it is keyed by a suitable key 19; and a yoke 20, slidably mounted on a rod 21, engages the pinion 13, as will be seen in Figs. 8 and 9, so that, by shifting the yoke, one or the other of the pinions 13 or 14 may be brought into engagement with the respective gears 15 and 16. The rod 21, upon which the yoke 20 slides, is supported in the casing member 9, which is provided with an opening at 22, opposite the sliding yoke 20. This opening at 22 is covered by a plate 23, having a notched slot 24, through which a rod 25 projects from the yoke 20, the rod serving as a handle for shifting the yoke and thereby shifting the pinions 13 and 14, as previously indicated. A spring 26, between the plate 23 and the yoke 20, is adapted to resiliently retain the rod or handle 25 in one or the other of the notches in the slot, as shown in Fig. 9.

As previously indicated, the gears 15—16 are secured to a shaft 18, the outer end of which is provided with a ball bearing at 27, mounted in a recess in the auxiliary casing member 9 and held in place by an annular plate 28, and screws 29, as will be seen in Fig. 2; the associated ball bearing collar being clamped to the shaft 18 by suitable lock nuts 30. The opposite end of the shaft 18 is preferably supported in a ball bearing 31, mounted in the casing bracket 6 and held in place on the end of the shaft by a suitable nut 32. The shaft 18 is preferably bored out, as indicated by dotted lines at 33, in Fig. 2, and a plunger or slide rod 34 is mounted therein, the rod being provided with a finger knob 35, so that it may be slid longitudinally of the shaft 18. The shaft 18 is provided with a transverse, longitudinally extending slit 36, through which a pin 37 projects from the rod 34. The pin 37 passes through a suitable hole in a collar 38, which is provided with spur pinions 39 and 40, and is adapted to slide on the shaft 18. By this arrangement, it will be seen that the change speed gears 39 and 40 may be shifted from the neutral position shown in Fig. 2, to engage one or the other of gears 41 and 42. For the purpose of retaining the collar 38 in one position or the other, it is preferably provided with a detent ball 43, mounted in a radial socket and thrust inward by a spring 44, to cooperate with one of the annular grooves 45, as will be seen in Fig. 2.

The gears 41 and 42 are keyed to a shaft 46, by a key indicated at 47, so as to rotate with the shaft, a ball bearing 48 being mounted on the shaft and clamped thereto, together with the gears by means of a suitable nut 49. The ball bearing 48 is located in a suitable counterbored opening 50 in the casing member 1, the ball bearing ring being held in place by an annular plate 51 and screws 52, as will be seen in Fig. 2. The opposite end of the shaft 46 is mounted in a ball bearing at 53, supported in the lower part of a partition 54, extending upward from the bottom 7 of the casing member 1.

The shaft 46 is provided with a spur pinion 55, adapted to mesh with a spur gear 56 (see Fig. 1), mounted upon and forming part of one of the clutch magnets (69). The inner end of the shaft 46 projects beyond the ball bearing 53 and is provided with a spur pinion 57, secured thereto by a suitable key and a nut 58. The pinion 57 engages another similar pinion 59, of the same size, similarly mounted on the inner end of a parallel shaft 60. The pinion 59 is secured to the end of the shaft 60 by a suitable key and a clamp nut 61. The inner end of the shaft 60 is supported in the partition 54 by a suitable ball bearing 62, while the outer end is supported in a ball bearing 63, mounted in a socket or opening in the wall of the casing 1, and secured therein and protected by a plate and cover 64, secured by screws 65. The ball bearing is clamped to the end of the shaft 60 by a suitable nut 66, as will be seen in Fig. 2. The shaft 60 is provided with another spur pinion 67 secured thereto and adapted to mesh with a spur gear 68 on the other of the clutch magnets 69, shown at the left in Fig. 2. The two clutch magnets 69 face each other, the one at the right in Fig. 2 carrying the spur gear 56, as previously described. By this arrangement, it will be seen that the pinions 55 and 67 will be rotated in opposite directions by power transmitted through intermdeiate gears from the motor 5, and the two rotary clutch magnets 69 will likewise be rotated in opposite directions by the meshing of the gears 56 and 68 with the respective pinions.

An important feature of the improvement resides in the arrangement, whereby the clutch magnets may be separated from engagement with the cooperating driving pinions and simultaneously moved bodily away from cooperative relation with the associated armatures, thereby permitting access to the contact brushes, to the gearing and to the faces of the magnets and armatures. In carrying out this purpose, the clutch magnest 69 are preferably mounted upon the hinged cover 2, as will be seen from the drawings and particularly Figs. 3 and 6. The clutch magnets 69 are mounted facing each other in axial alignment but separately, in proper spaced relation, on stud shafts 70, clamped in bosses 71, integral with the cover portion 2, by suitable nuts 72, as will be seen in Fig. 3. The shell or body portion of each clutch magnet 69 is bored out at 73 and counterbored to receive the ball bearings at 74 and 75, which are held in place by suitable nuts, such as shown at 76. The bore in the body of the magnetic clutches 69 is closed at one end by a disc 77 and at the other end by an annular member 78, which is held in place by suitable screws 79. Each clutch magnet 69 is provided with an annular cavity, in which the magnet coil 80 is mounted, the mouth of the cavity being preferably closed, over the coil, by an annular flat ring 81, so that the face of the magnet 69 presents a smooth surface. Each clutch magnet 69, besides carrying the respective spur gears 56 and 68, as previously indicated, also carries a ring of insulating material 82, in which two collector or contact rings 83 are embedded, as represented in Figs. 2 and 3. The ends 84 and 85 of the magnet coil 80 are connected to the respective rings by suitable screws 86 in lugs 87 projecting from the rings.

The contact brushes 88, for cooperation with the respective collector rings 83, are preferably mounted in plunger cylinders 89, provided with plungers 90, spring-pressed outward by suitable springs 91, as will be seen in Fig. 7 of the drawings. The plunger cylinders 89 are provided with caps 92, through which the carbon brushes 88 project to engage the respective collector rings. The plunger cylinders 89 are preferably mounted in brush carrying arms 93, which are secured by bolts 94 to the upstanding arms 95 of brackets 96, secured by bolts 97 to a suitable support, within the lower casing member 1, such as the bottom 7 thereof, as indicated in the drawings. The respective circuits of the brushes 88 may be completed through suitable lead lines 98.

In order to permit the separation of the clutch magnets from the associated armatures, the armatures 99 are rotatably supported in a vertical partition 100, which is provided with a kerf or vertical cut, in which the spur pinion 101 is located. The spur pinion is integral with or mounted upon a cylindrical hub 102, on the ends of which ball bearings 103 and 104 are mounted, as will be seen in Fig. 3. These ball bearings are clamped in place by a suitable cap 100a and bolts 100b, passing therethrough and entering the partition 100, as shown in Fig. 1. The two armatures 99, for cooperation with the respective clutch magnets, are preferably secured by suitable screws or rivets 105 to flanged thimbles 106, which fit into the ends of the hub 102 and are adapted to be clamped thereto by a screw 107, which may be locked by a suitable lock screw 108. The peripheral edges of the armatures 99 preferably may be beveled, as indicated at 109, so as to facilitate swinging the clutch magnets 69 back into cooperative relation therewith. The armatures 99 and hub 102 are permitted a small amount of lateral play, in order to facilitate the clutching action between the respective armatures and magnets for direct and reverse feed, according to which clutch magnet 69 is energized.

The armature pinion 101 engages a spur gear 110, which, as will be seen in Figs. 1, 2 and 4, is mounted on a shaft 111, the inner end of which is supported on ball bearings 112, in one section of the partition 100, the ball bearing ring being held in position on the shaft by suitable lock nuts 113. The outer end of the shaft 111, shown at the left in Fig. 2, is supported by ball bearings 114, in a socket 115 in the wall of the body portion of the casing 1. The end of the shaft 111 projects through the casing 1 and a pinion 116 is secured thereto by a suitable clamping nut 117. The pinion 116 is adapted to mesh with a suitable gear 118, secured to the feed screw 119 of any machine tool, the feed of which it is desired to operate and control through the magnetic clutches. As previously indicated, the improved magnetic clutch gear case unit is adapted to be manufactured as a separate unit, and arranged to be attached to a variety of machine tools, for operation of the feed mechanism thereof. For this purpose, the wall of the casing 1 through which the shaft 111 projects, is preferably provided with flanges 120, through which suitable bolts 121 are adapted to pass, for securing the magnetic clutch gear unit to the frame 122 of the machine tool, in position to cooperate with the mechanism to be operated thereby.

From the foregoing description, it will be understood that after the gear case unit has been properly secured to the machine tool, and the casing cover 2 is clamped down by the bolt and nut 4, the clutch magnets, through the gears 56 and 68 engaging the respective pinions 55 and 67, will be rotated in opposite directions by means of the intermediate change speed gears connected with the motor 5, as previously indicated. According to the speed required, either the pinion 13 or 14 may be brought into mesh with the respective gears 15 and 16 by shifting the collar 12 with the handle 25, as shown in Figs 8 and 9. An additional change of speed between the motor and the clutch magnets may be effected by shifting the gears 39 and 40, by means of the rod 34 and knob 35 to engage one or the other of the gears 41 and 42, which, as previously indicated, are mounted on the shaft carrying and driving the pinions 55 and 67 engaging and rotating the clutch magnets 69 in opposite directions. In this manner, it will be understood that a plurality of speeds is provided, any one of which may be utilized by proper adjustment of the change speed gears.

When it is desired to oil the gearing; adjust or replace the contact brushes 88, or clean the faces of the clutch magnets and armatures, the cover 2, rotatably supporting the clutch magnets 69, may be lifted, as indicated in Fig. 6, so as to bodily separate the clutch magnets from the armatures 99 so that access may be had to the cooperating surfaces thereof, for cleaning the same. Likewise, when the clutch magnets are lifted out of the casing, access may be had to the brushes 88 and the associated connections for adjustment, replacement or repairs. As soon, however, as the cover 2 is replaced in position on the lower casing member 1 and clamped thereto by the bolt and nut 4, the magnetic clutch gear case unit is in position for normal operation, with the gears 56 and 68, again in mesh with the respective driving pinions 55 and 67 and the armatures 99 in proper cooperative relation with the clutch magnets 69.

It will be understood that while one form and adaptation of our improved magnetic clutch gear case unit has been shown and described, the arrangement is not limited to the specific details of construction shown, for various modifications and rearrangements thereof may be made without departing from the spirit and scope of the invention.

We claim:

1. A magnetic clutch gear case unit, comprising a pair of rotary magnets, in axial alignment and facing each other, a pair of armature discs rotatably mounted between said magnets for cooperating therewith and means whereby the rotary magnets and armatures may be separated bodily to permit cleaning the cooperating surfaces thereof.

2. A magnetic clutch gear case unit, comprising a pair of rotary clutch magnets, a pair of armatures mounted for cooperation with said magnets, contact rings associated with the respective rotary magnets, brushes adapted to cooperate with said contact rings for completing the circuits of the respective magnets, and means for bodily separating the magnets from the armatures and simultaneously separating said contact rings from the respective brushes, thereby permitting access to the latter.

3. A magnetic clutch gear case unit, comprising a pair of rotary clutch magnets, each provided with a pair of contact rings, contact brushes mounted for cooperation with the respective contact rings to complete the circuits of said magnets, a separable two-part casing, one part of which is adapted for rotatably supporting said magnets, while said brushes are supported on the other part of said casing, the arrangement being such that by separating the casing the magnets are removed so that access may be had to said brushes.

4. A magnetic clutch gear case unit, comprising a pair of clutch magnets, a pair of armature discs adapted to cooperate with said clutch magnets, cooperating clutch faces of the armatures and magnets being normally in axial alignment, and means for mounting said armatures and magnets so that they may be separated for cleaning the cooperating clutch faces.

5. A magnetic clutch gear case unit, comprising a casing, a removable cover plate for said casing, a pair of clutch magnets mounted for rotation within said casing, a pair of armatures mounted for cooperation with said rotary magnets, cooperating clutch faces of the armatures and magnets being normally in axial alignment, and means associated with said casing and cover adapting said magnets and armatures to be bodily separated upon removing said cover, so that said cooperating clutch faces become accessible.

6. The magnetic clutch gear case unit as claimed in claim 5, in which said casing cover is hinged to the casing and the clutch magnets are rotatably supported on said cover, so that when the cover is swung open on its hinges, the magnets and armatures are bodily separated.

7. A magnetic clutch gear case unit, comprising a pair of clutch magnets, means for rotating said magnets, a pair of rotatable armatures mounted for cooperation with said clutch magnets, cooperating clutch faces of the armatures and magnets being normally in axial alignment, and means for mounting said rotating means and the armatures and magnets so that the latter may be bodily separated from said rotating means and the armatures for access to said cooperating faces for cleaning and adjustment.

8. A magnetic clutch gear case unit, comprising a two-part casing, a pair of clutch magnets rotatably mounted on one part of said casing, a pair of armatures rotatably mounted on the other part of the casing for cooperating with said magnets, means in one part of the casing for rotating said clutch magnets, the magnets and armatures and the means for rotating the magnets being so mounted in the two parts of the casing that the clutch magnets may be bodily separated from the armatures by separating the two parts of the casing.

9. The magnetic clutch gear case unit as claimed in claim 8, in which each clutch magnet is provided with a pair of contact rings and contact brushes cooperating with said rings for completing the circuits of the respective magnets, said brushes being mounted in the part of the casing supporting said armatures, whereby when the clutch magnets are separated from the armatures they are also separated from said contact brushes.

10. A magnetic clutch gear case unit, comprising a casing, including a cover portion and a body portion, a pair of clutch magnets rotatably mounted on said cover portion, a pair of armatures rotatably mounted on said body portion for cooperation with said magnets when said cover and body portions are in normal position, stud shafts on the cover portion for rotatably supporting said clutch magnets and a bracket on the body portion adapted to extend between said stud shafts and provide bearing supports for said armatures, the magnets and armatures being substantially in axial alignment when the cover is closed on the body portion, the arrangement being such that upon removing the cover from the body the clutch magnets are bodily separated from the armatures.

JOHN C. SHAW.
ROBERT D. SHAW.